United States Patent [19]
Hirosawa et al.

[11] 3,858,972
[45] Jan. 7, 1975

[54] SLIDE PROJECTOR
[75] Inventors: Tomio Hirosawa; Susumu Otsuka, both of Tokyo, Japan
[73] Assignee: Cabin Kogyo Kabushiki Kaisha, Tokyo, Japan
[22] Filed: Nov. 16, 1972
[21] Appl. No.: 307,206

[30]     Foreign Application Priority Data
         Nov. 18, 1971   Japan.............................. 46-92620

[52] U.S. Cl................................. 353/118, 353/85
[51] Int. Cl............................................. G03b 23/04
[58] Field of Search............ 353/85, 86, 83, 90, 93, 353/118

[56]              References Cited
              UNITED STATES PATENTS
3,161,109   12/1964   Carillo...................... 353/86
3,468,603    9/1969   Kovarik..................... 353/86
3,501,232    3/1970   Jackson..................... 353/90

Primary Examiner—Louis R. Prince
Assistant Examiner—A. J. Mirabito
Attorney, Agent, or Firm—Cushman, Darby & Cushman

[57]              ABSTRACT

A slide projector having a pair of fixed projecting optical systems, a single magazine and a pair of slide carriers for bringing slides in the said magazine into and taking them out of a pair of projecting light paths and the said slide projector being arranged so that a plurality of slides housed in the said magazine can be projected in proper order smoothly and reliably. The said slide projector is provided with light adjusting devices for maintaining the brightness of the image to be projected on the screen at an approximately constant amount and also provided with a control device for automatically putting out the projecting lamps and automatically stopping the operation when a slide is not held in the slide carrier which is brought into the projecting light path during projecting operation.

1 Claim, 15 Drawing Figures 3,858,972

SLIDE PROJECTOR

BACKGROUND OF THE INVENTION a. Field of the Invention

The present invention relates to slide projectors and more particularly, to an automatic slide projector having a pair of projecting optical systems, a single magazine and a pair of slide carriers which pick up the slide from the said magazine by turns and insert it in the said pair of projecting optical systems alternately.

b. Description of the Prior Art

Slide projectors of this kind are already known for example according to Japanese Pat. Publication No. 45-13114. On those known slide projectors, however, a pair of projecting optical systems are moved by turns being relative to each other, and at the same time, the magazine is moved being related to the motion of the said pair of projecting optical systems, thus a plurality of slides housed in the magazine are projected in turn. Consequently, when using this kind of conventional projectors, two projecting optical systems move forward and backward and, therefore, there are various disadvantages regarding their functions and performance. Besides, on this kind of conventional slide projectors, it is inconvenient as it is necessary to use a magazine specially designed for the use on a particular projector.

SUMMARY OF THE INVENTION

Therefore, it is a principal object of the present invention to provide a new and improved automatic slide projector on which a pair of projecting optical systems are held at the definite position and on which the commercially available ordinary rectangular or ring type magazines can be used.

Another object of the present invention is to provide an automatic slide projector on which the projecting operation stops automatically and the light-source lamps are put out automatically when all of the plurality of slides housed in the magazine are projected or when, during operating, a slide to be brought into the projecting light path is missing in the magazine.

Still another object of the present ivention is to provide an automatic slide projector with which the illumination on the screen can be always kept at a constant amount during its operation.

A further object of the present invention is to provide an automatic slide projector which can be operated easily and which works smoothly with high reliability.

The foregoing and other objects, features and advantages of the invention will be apparent from the following description of the preferred embodiment of the invention illustrated in the accompanying drawings.

DESCRIPTION OF THE PREFERRED EMBODIMENT

Figure 1:
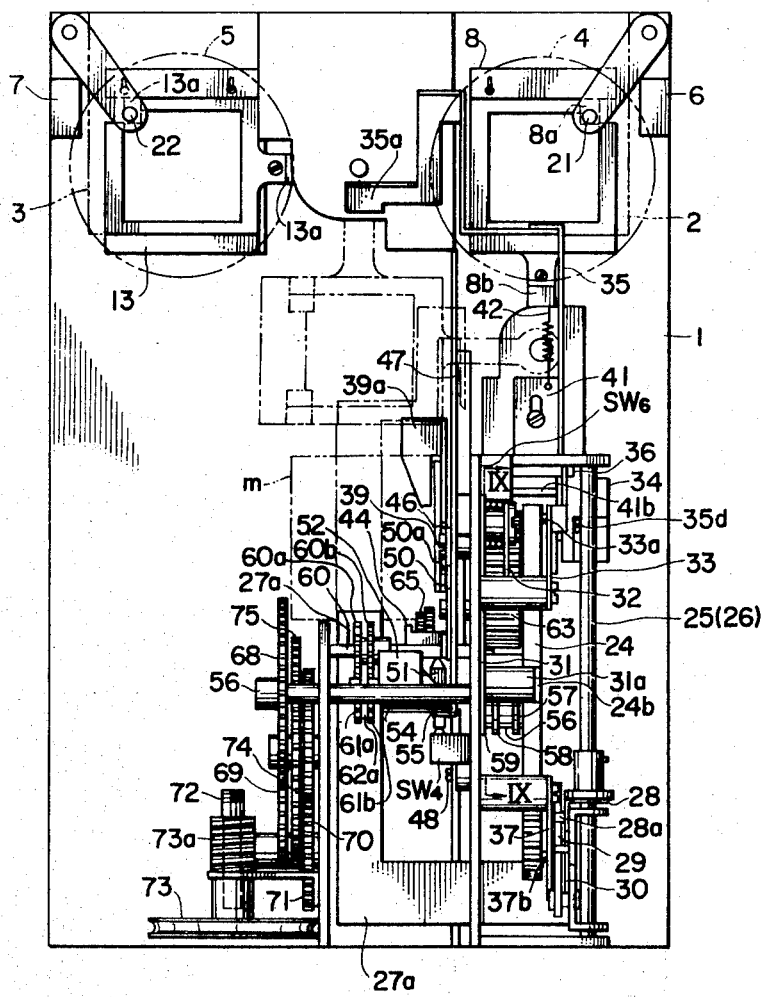
FIG. 1 shows a front view of the main part of a slide projector constructed according to the present invention.

Referring now to the drawings, numeral 1 designates the base plate of the projector, numerals 2 and 3 designate the lamp housings of the known art which are mounted on both sides at the upper part of the base plate 1 (FIGS. 2 and 3) and which respectively house the light source lamps $La$ and $Lb$ which will be described later. Numerals 4 and 5 designate projecting lenses which are slidably mounted to the base plate 1 and each of them corresponding either to the lamp housing 2 or 3. Numerals 6 and 7 designate auxiliary light sources fixed to the base plate 1 on the side at the front ends of lamp housings 2 and 3, respectively. Numeral 8 represents a slide carrier of known art which has a reflecting mirror 8a at its one corner and is fixed through an arm 8b to a rotary shaft 9 which is rotatably mounted to the base plate 1. To the rotary shaft 9, an arm 10 is also fixed. Numeral 11 represents a rocking lever which is connected, by one end, to the arm 10 through a pin and slot (see FIG. 4) and is pivotably mounted to the base plate 1 by the other end, the said lever having a pin 11a attached at its intermediate portion. Numeral 12 designates a coil spring which is loosely wound on the rotary shaft 9 and biases the arm 10 clockwise at the position shown in FIG. 4. Numeral 13 represents a slide carrier of the same structure as the slide carrier 8 which has a reflecting mirror 13a at its one corner and is fixed through an arm 13b to the rotary shaft 14 rotatably mounted to the base plate 1. To the rotary shaft 14, an arm 15 is also fixed. Numeral 16 designates a connecting link which is connected to an arm 15 by one end through a pin and slot (see FIG. 4) and is fixed by the other end to the sleeve 17, which is slidably fitted to the rotary shaft 9 but cannot be moved in thrust direction. Numeral 18 represents a coil spring which is loosely wound on the sleeve 17 and biases the connecting link 16 counterclockwise at the position shown in FIG. 4. Numeral 19 represents a rocking lever fixed to the sleeve 17 by its base portion and provided with a pin 19a at its tip. Numeral 20 designates a coil spring which is loosely wound on the rotary shaft 9 and biases the rocking lever 19 clockwise at the position shown in FIG. 4, the said spring being weaker than the coil spring 18. Numeral 21 designates a photoelectric element, for example, a photo-transistor which is provided at the position where it can receive the light from the auxiliary light source 6 reflected from the reflecting mirror 8a when the slide carrier 8 is at the position shown in the figure. Numeral 22 represents a photoelectric element, for example, a photo-transistor which is provided at the position where is can receive the light from the auxiliary light source 7 reflected from the reflecting mirror 13a when the slide carrier 13 is at the position shown in the figure. Numeral 23 designates a drum cam rotatably mounted to the base plate 1 and having two cam surfaces, i.e., the upper cam surface 23a which slidably contacts the pin 11a and lower cam surface 23b which also slidably contacts the pin 19a, and another cam surface 23c which is concentric to cam surfaces 23a and 23b, the said drum cam also having protuberances 23d and 23e formed on its side wall and also a gear 23f which is concentrically fixed to its bottom surface (see FIG. 4). Numeral 24 designates a cam plate rotatably mounted to the base plate 1 and having a heart-shaped continuous cam groove 24a on its surface and a concave 24b on its periphery. Numerals 25 and 26 designate guide rods fixed to the base plate 1 being parallel to each other. Numeral 27 designates a sliding frame which is slidably fitted to the guide rods 25 and 26 and has a pushing plate 27a, which can enter into and come out from the slide holding space of the slide magazine m to be described later. Numeral 28 represents an interlocking piece which has a pin 28a and slot 28b on its back surface and is slidably fitted to the guide rods 25 and 26 being laid upon the sliding frame 27. Numeral 29 shows a connecting lever pivotably mounted to the sliding frame 27 and having a hook 29a, which engages with the pin 28a. Numeral 30 represents a spring which biases the lever 29 counterclockwise at the position shown in FIG. 2 and pushes it so that the hook 29a of the connecting lever 29 engages with the pin 28a. Numeral 31 designates a lever pivotably mounted to the base plate and having at one arm end a roller 31a which can be fitted into the concave 24b and also having a bent piece 31b at the other arm end. Numeral 32 designates a spring which biases the lever 31 counterclockwise at the position shown in FIG. 2. Numeral 33 represents a rocking lever pivotably mounted to the base plate 1 by its base portion and having a pin 33a at its intermediate portion which fits in the cam groove 24a of the cam plate 24 and also having a slot 33b at its tip. Numeral 34 designates a sliding piece slidably fitted to the guide rod 26 and having a pin 34a which is fitted into the slot 33b of the rocking lever 33 and also having a vertical slot 34b. Numeral 35 represents a slide returning plate which is connected by its bottom end to the sliding piece 34 by a screw 35d passed through the slot 34b and has a bent portion 35a at its top portion which serves to return the slide into the magazine m from the slide carriers 8 and 13 when the said slide carriers 8 and 13 are moved to the position just above the magazine (the position shown by chain lines in FIG. 1), the said slide returning plate also having at its intermediate portion a protuberance 35b and a cam groove 35c, which fits a pin 36 projected from the base plate 1. Numeral 37 designates a rocking lever which is pivotably mounted to the base plate 1 by its base portion and, at its tip portion, has a pin 37a which fits in the slot 28b of the interlocking piece 28 and also a pin 37b which fits in the cam groove 24a of the cam plate 24. Numeral 38 designates a rotary solenoid which is mounted on the base plate 1 and has a driving piece 38a which serves to disengage the pin 28a from the hook 29a by turning the connecting lever 29 clockwise as seen in FIG. 2 when the solenoid is energized by the driving control circuit as described later.

Figure 2:
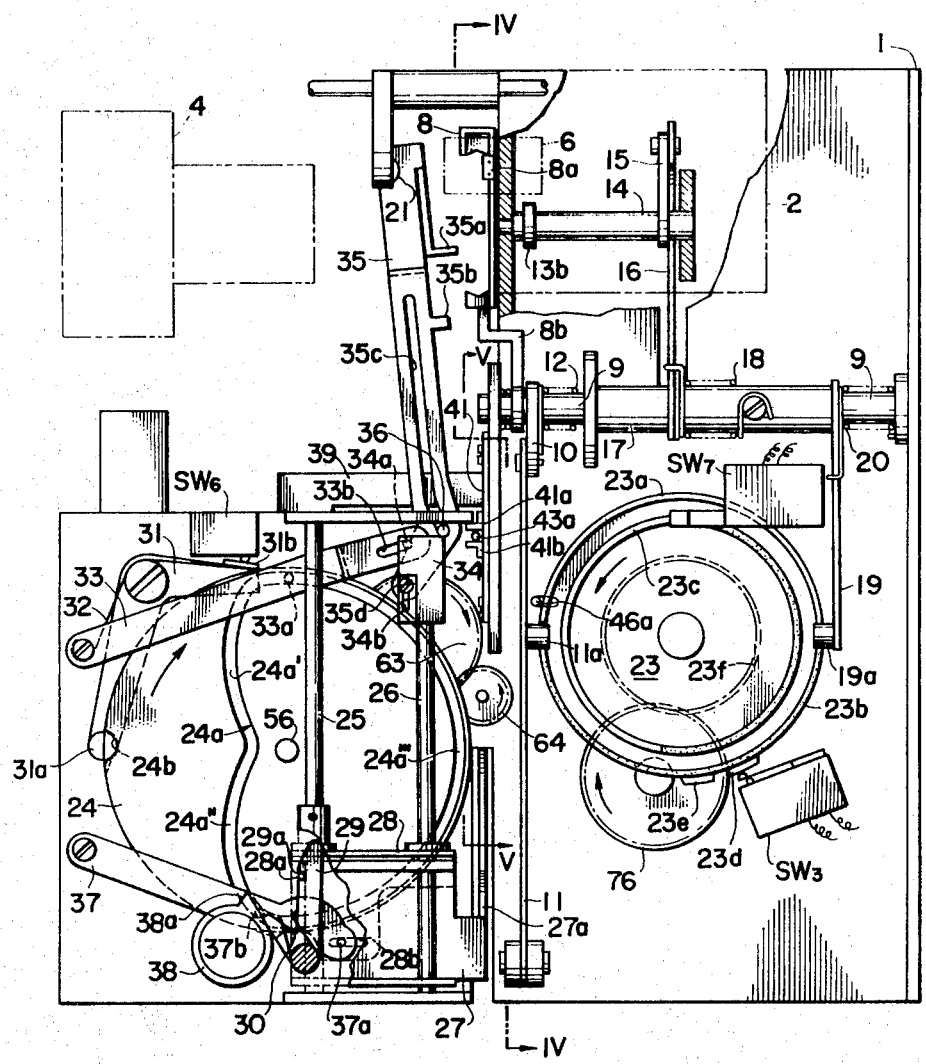
FIG. 2 shows the right side view of the embodiment shown in FIG. 1.
Figure 3:
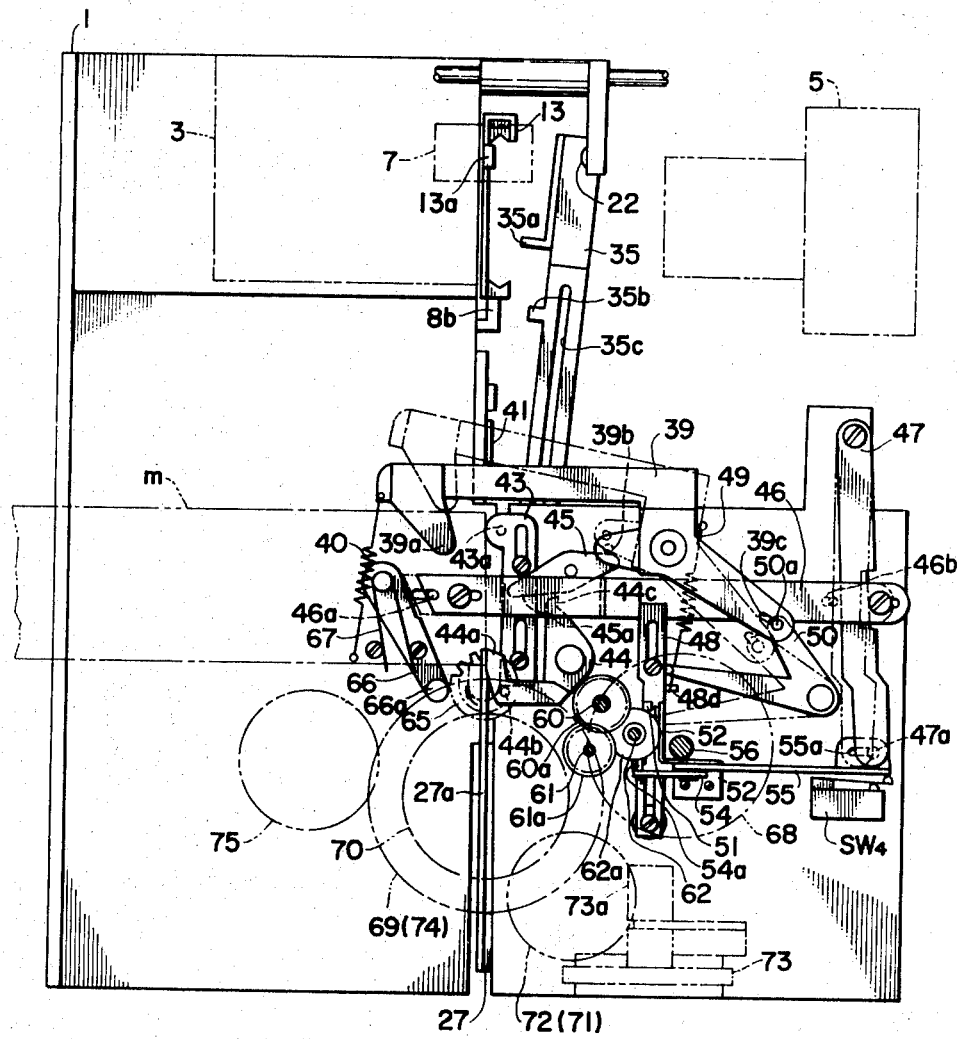
FIG. 3 shows the left side view of the embodiment shown in FIG. 1.
Figure 5:
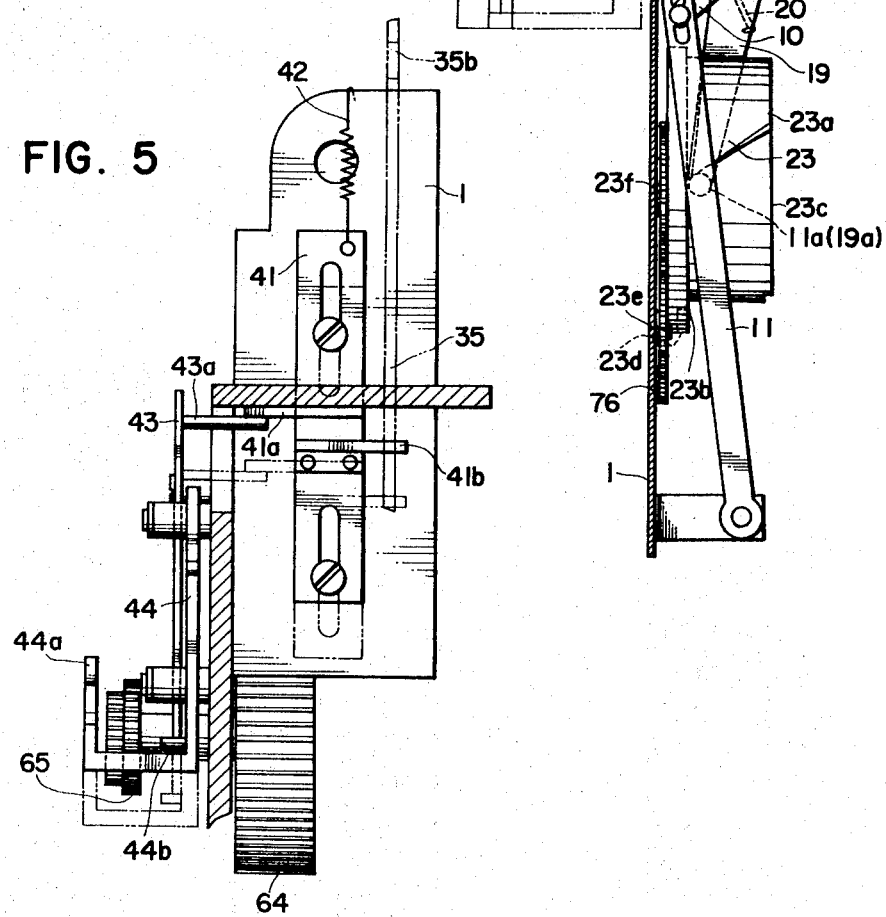
FIG. 5 shows an enlarged side view of the principal part of the embodiment along the line V—V in FIG. 2.
Figure 6:
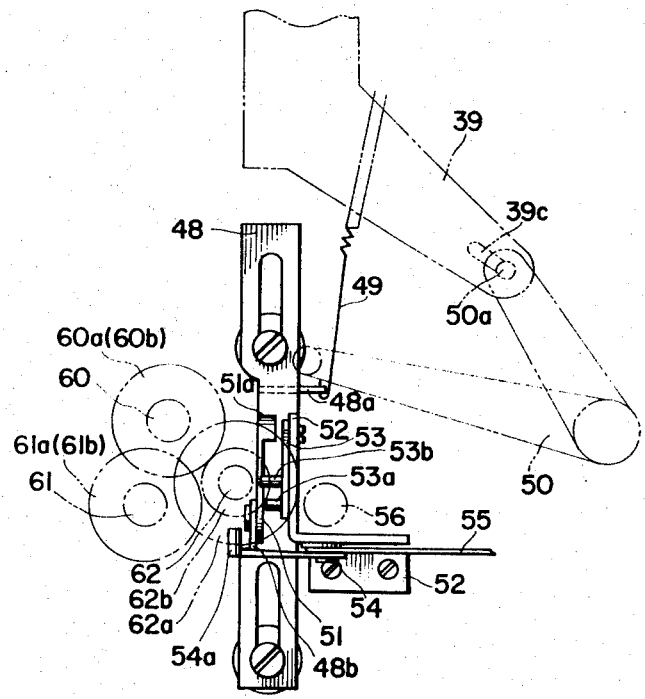
FIG. 6 shows a partial enlarged view of FIG. 3.
Figure 7:
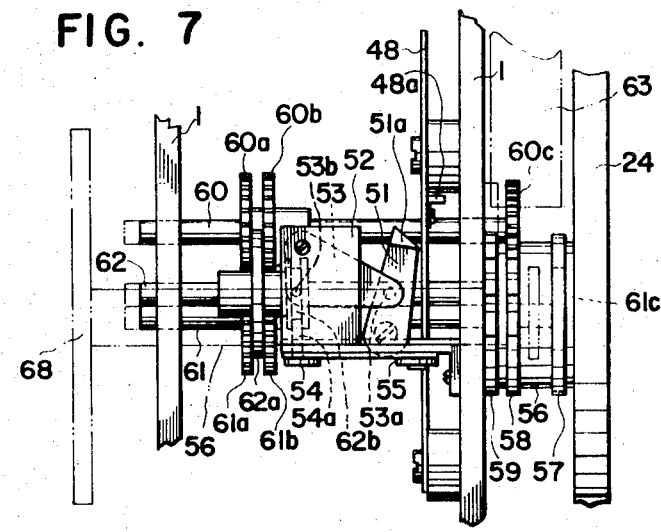
FIG. 7 shows a partial enlarged view of FIG. 1.
Figure 8:
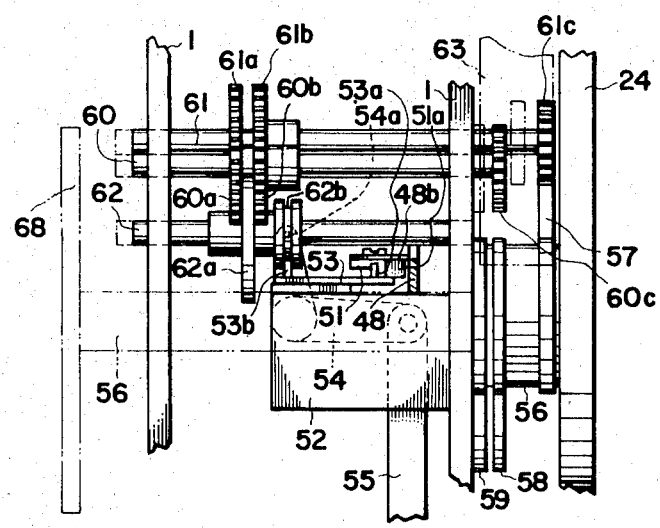
FIG. 8 shows a top view of the part shown in FIG. 7.

Now referring to FIG. 3, which is a rear view in relation to FIG. 2, numeral 39 designates a feed control lever pivotably mounted to the base plate 1 and having a protuberance 39a, which can contact the circumference of the slide magazine m, and also having a pin 39b and slot 39c. Numeral 40 represents a spring which biases the feed control lever 39 counterclockwise. Numeral 41 shows a sliding plate slidably mounted to the base plate 1 as clearly illustrated in FIG. 5 and having, at its intermediate portion, a pair of bent pieces 41a and 41b which are opposed to each other. Numeral 42 shows a spring which biases the sliding plate 41 upward. Numeral 43 designates a sliding plate which is slidably mounted to the base plate 1 and has a pin 43a, at is upper part, which projects through the slit formed in the base plate 1 and contacts the bottom surface of the bent piece 41a of the sliding plate 41. Numeral 44 designates a stop lever which is pivotably mounted to the base plate 1 and biased clockwise and which has an arm 44a on one end being arranged so that it can contact the front end face of the magazine m and also has a pin 44b which contacts the bottom end face of the sliding plate 43. Numeral 45 designates an intermediate lever pivotably mounted to the base plate 1 and biased counterclockwise and having one arm end which contacts the pin 39b of the feed control lever 39 and also having, at the other arm end, a hook 45a which is formed so that it can engage with another arm end 44c of the stop lever 44. Numeral 46 designates a sliding plate which is mounted to the base plate 1 and is slidable in horizontal direction, the sliding plate having on one end a pin 46a which can project through the slot provided to the base plate 1 and can contact the protuberance 23d formed on the sidewall of the drum cam 23 and also having a pin 46b on the other end. Numeral 47 represents a rocking lever with its base portion pivotably mounted to the base plate 1 and having a pin 47a at its tip, the intermediate sidewall of the said rocking lever being in contact with pin 46b of the sliding plate 46. Numeral 48 shows a sliding plate having a bent piece 48a and slidably mounted to the base plate 1 as clearly shown in FIGS. 6, 7 and 8. Numeral 49 shows a spring which biases the sliding plate 48 upward. Numeral 50 represents an intermediate lever pivotably mounted to the base plate 1 and having two arms, one arm end of the said intermediate lever being connected to the control lever 39 by the pin 50a which fits in the slot 39c of the said feed control lever 39 and the other arm end being in contact with the upper surface of the bent piece 48a of the sliding plate 48. Numeral 51 designates a control piece pivotably mounted by its base portion to the bent portion 48b of the sliding plate 48 and having a triangular protuberance 51a (see FIG. 7) at its tip, and the said control piece being biased clockwise at the position shown in FIG. 7. Numeral 52 shows a bracket adjacent to the sliding plate 48 and fixed to the base plate. Numeral 53 designates a change-over lever pivotably mounted to the bracket 52 and having a pin 53a at its tip which can engage with the protuberance 51a of the control piece 51 and also having another pin 53b near its base portion. Numeral 54 shows a change-over lever pivotably mounted to the bracket 52 and having a pin 54a at its one arm end. Numeral 55 designates a connecting link with its one end pivotably mounted to another arm end of the lever 54 and with a slot 55a formed at the other end which fits the pin 47a of the rocking lever 47. Numeral 56 shows a main shaft of the cam plate 24 which is rotatably supported on the base plate 1. Numeral 57 shows a skip-tooth gear having only one tooth and being fixed to the main shaft 56 as clearly shown in FIG. 9. Numeral 58 shows a skip-tooth gear fixed to the main shaft 56 and having two teeth at the position symmetrical to the tooth of the skip-tooth gear 57 in relation to the main shaft axis. Numeral 59 shows a skip-tooth gear with only one tooth which is mounted to the main shaft 56 at the same position as the skip-tooth gear 58 but slightly spaced from the said skip-tooth gear 58 in axial direction. Numeral 60 designates a rotary shaft which is rotatably mounted to the base plate 1 and is movable in axial direction, the said rotary shaft having a pair of gears 60a and 60b with the same number of teeth and opposed to each other and also having a gear 60c at the shaft end which can mesh with the skip-tooth gear 58 or 59 alternatively. Numeral 61 shows a rotary shaft which is rotatably mounted to the base plate 1 in parallel to the rotary shaft 60 and is movable in thrust direction, the said rotary shaft having a pair of gears 61a and 61b with the same number of teeth as the gears 60a and 60b which respectively mesh with the gears 60a and 60b and also having, at the shaft end, a gear 61c with the same number of teeth as the gear 60c which can mesh with the skip-tooth gear 57. Numeral 62 designates a sliding shaft mounted to the base plate 1 being movable in thrust direction which has a flange 62a that can be slidably fitted in common into the spaces between the pairs of opposed gears 60a and 60b and gears 61a and 61b and which has a ring groove 62b fitted in common to the pin 53b of the change-over lever 53 and pin 54a of the change-over lever 54. Numeral 63 shows an intermediate gear rotatably supported by the base plate 1 which meshes with the gear 60c. Numeral 64 shows a gear rotatably supported by the base plate 1 which meshes with the intermediate gear 63. Numeral 65 designates a feed pinion of the known art (see FIG. 1 and FIG. 3) which is integral with the gear 64 and meshes with the rack of the magazine m to be inserted into the pre-determined position. Numeral 66 designates a regulating lever pivotably mounted to the base plate 1 which has at its tip a roller 66a which is to be fitted into the space between teeth of the feed pinion 65 and accurately regulates the rotation of the said pinion 65 (see FIG. 3). Numeral 67 designates a spring which biases the regulating lever 66 counterclockwise at the position shown in FIG. 3. Numeral 68 designates a gear fixed to the end of the main shaft 56 of the cam plate 24, numeral 69 designates a skip-tooth gear rotatably mounted to the base plate 1 as clearly shown in FIG. 10 which meshes with the gear 68, and numeral 70 designates a gear which is concentric and integral with the skip-tooth gear 69. Numeral 71 designates a gear rotatably fixed to the base plate 1 which meshes with the gear 70, and numeral 72 designates a worm wheel which is concentric and integral with the gear 71. Numeral 73 represents a pulley which is rotatably mounted to the base plate 1 and has a worm 73a meshing with the worm wheel 72 and which is driven by the motor M described later. Numeral 74 designates a skip-tooth gear which is concentric and integral with the skip-tooth gear 69 and has the same pitch circle as that of the said skip-tooth gear 69, the relative position of the said skip-tooth gear 74 being selected so that its skip-tooth portion comes to the side opposite to that of the said skip-tooth gear 69. Numeral 75 shows a gear which is rotatably mounted to the base plate 1 and meshes with the skip-tooth 74. Numeral 76 (see FIG. 2) designates a gear which is concentric and integral with the gear 75 and meshes with the gear 23f of the drum cam 23. Reference symbol m designates a magazine of the known art which is set to the base plate 1 by a suitable guide mechanism not shown.

Figure 11:
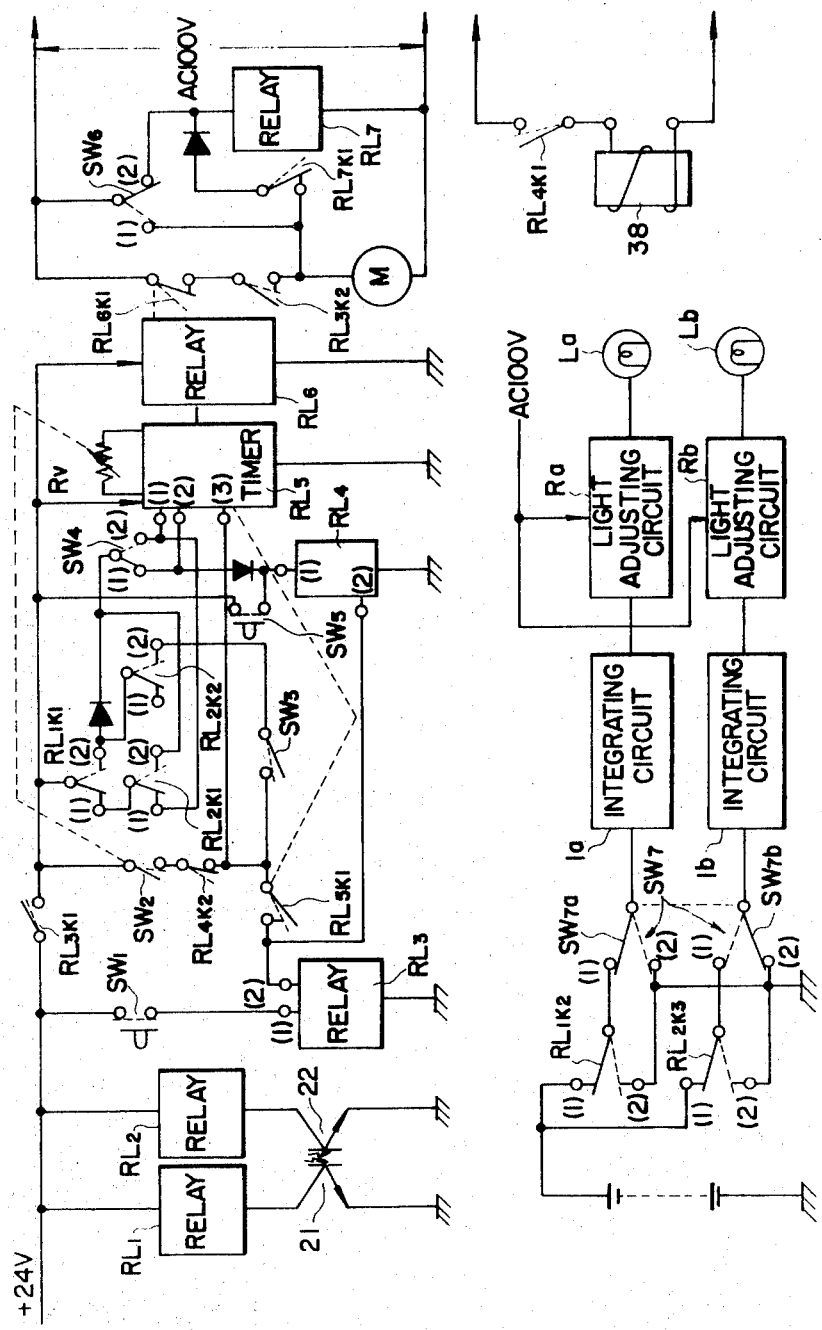
FIG. 11 is a block diagram showing an example of the driving control circuit for the embodiment of the present invention.

FIG. 11 shows an example of the driving control circuit of the slide projector of the present invention. In this diagram, reference symbol $RL_1$ represents a relay which is actuated when the aforementioned phototransistor 21 is activated by incidence of light, and $RL_2$ represents a relay which is actuated when the aforementioned photo-transistor 22 is activated by incidence of light. Symbols $RL_{1k1}$ and $RL_{1k2}$ are relay armatures respectively changed over from the fixed contacts (1) to (2) when the relay $RL_1$ is actuated. Symbols $RL_{2k1}$, $RL_{2k2}$ and $RL_{2k3}$ are relay armatures respectively changed over from the fixed contacts (1) to (2) when the relay $RL_2$ is actuated. Reference symbol $SW_1$ represents a push-button type starting switch, symbols $RL_3$ and $RL_4$ represent relays, symbols $RL_{3k1}$ and $RL_{3k2}$ are relay armatures which are respectively opened and closed by actuation of the relay $RL_3$, and symbols $RL_{4k1}$ and $RL_{4k2}$ are relay armatures which are respectively opened and closed by actuation of the relay $RL_4$. Reference symbol $SW_2$ represents a manually operated switch, and $SW_3$ represents a normally open type micro-switch which is closed by the protuberance 23d of the drum cam 23. Reference symbol $SW_4$ represents a micro-switch which is changed over from the fixed contacts (1) to (2) when the connection link 55 is moved rightward from the position shown in FIG. 3. Reference symbol $SW_5$ represents a push-button switch. Reference symbol $SW_6$ represents a micro-switch which is changed over from the fixed contacts (2) to (1) when the lever 31 is turned clockwise from the position shown in FIG. 2. Reference symbol $SW_7$ represents a light source ON-OFF switch which includes two movable contact pieces $SW_{7a}$ and $SW_{7b}$ being interlocked with each other and for which change-over is controlled so that the movable contact piece $SW_{7b}$ is connected to the fixed contact (2) when the movable contact piece $SW_{7a}$ is connected to the fixed contact (1) by means of the cam surface 23c of the drum cam 23 and that the movable contact piece $SW_{7b}$ is connected to the fixed contact (1) when the movable contact piece $SW_{7a}$ is connected to the fixed contact (2). Reference symbol $RL_5$ represents a timer having three kinds of input terminals for which operating times are different. The timer $RL_5$ is composed as follows. When an input is applied to the input terminal (1), the timer operating time is decided according to the resistance of the variable resistor $R_v$ which is set being interlocked with the manually operated switch $SW_2$. When an input is applied to the input terminal (2), the time required for one stroke of the mechanism to be described later is decided as the timer operating time. When an input is applied to the input terminal (3), the time required for one stroke of the mechanism including the overlapping time to be described later is decided as the timer operating time. In any case, the relay is actuated when the timer, which starts its operation at the same time when the input signal comes in, finishes its operation and issues an output signal. Reference symbol $RL_{5k1}$ is a relay armature which closes the circuit only when an input is applied to the input terminal (3) and relay of the timer $RL_5$ is actuated. Reference symbol $RL_6$ represents a relay which includes a delay circuit and is actuated after a certain time from the instant when an input from the timer $RL_5$ is applied. Reference symbol $RL_{6k1}$ is a relay armature which opens the circuit only when the relay $RL_6$ is being actuated. Reference symbol $RL_7$ represents time delay relay which works at a certain time after being energized. Reference symbol $RL_{7k1}$ is a relay armature which closes the circuit only when the time delay relay $RL_7$ is being operated. Reference symbold $I_a$ and $I_b$ represent integrating circuits respectively connected to the movable contact pieces $SW_{7a}$ and $SW_{7b}$ of the light source ON-OFF switch $SW_7$ and are composed so that the output voltage gradually rises when a voltage is imposed to the input terminal and that the output voltage gradually decreases when the input terminal is connected to the earth. Reference symbols $R_a$ and $R_b$ represent light adjusting circuits which respectively put on the light-source lamps $L_a$ and $L_b$ by a voltage which is approximately in proportion to the input from the integrating circuits $I_a$ and $I_b$.

Figure 4:
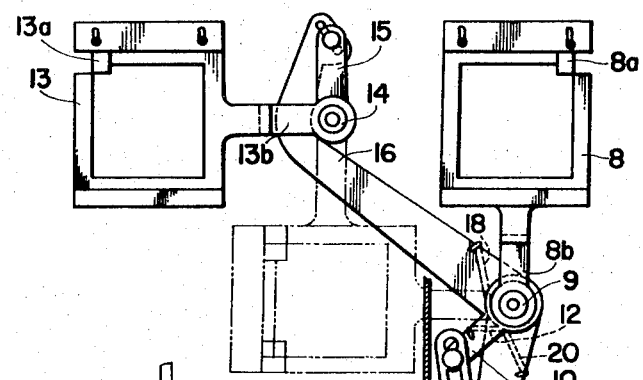
FIG. 4 shows a side view of the main part of the embodiment along the line IV—IV in FIG. 2.

In the present embodiment of the invention, the difference between heights of cam surfaces 23a and 23b of the drum cam 23 is selected so that rocking of the slide carriers 8 and 13 to be performed respectively through the rocking levers 11 and 19 can be performed between the position shown by full lines (the slide projecting position) and the position shown by chain lines (the slide returning position) shown in FIG. 1 and FIG. 4. The cam groove 24a of the cam plate 24 consists of the groove portions 24a' and 24a'' extending approximately in the diameter direction and the concentric circular arc portion 24a''' as clearly shown in FIG. 2. Length of the groove portion 24a' and 24a'' is selected so that the vertical movement of the slide returning plate 35 to be performed through the rocking lever 33 can be carried out between the position shown by full lines and the position shown by chain lines (the position where the slide is returned from the slide carrier 8 and 13 into the magazine m) shown in FIG. 1, and also that the vertical motion of the pushing plate 27a to be performed through the rocking lever 37 can be carried out between the position shown by full lines and the position shown by chain lines (the position where the slide is inserted from the magazine m into the slide carrier 8 or 13 which is brought to the position just above the magazine m) shown in FIG. 1. Besides, the relay $RL_3$ is composed so that it is held in the energized condition when a voltage is imposed to the terminal (1) even when said voltage is eliminated and that it is reset to the original condition only when a voltage is again imposed to the terminal (2).

The present embodiment of the slide projector related to the present invention is composed as described in the above. In the following, the operation of said projector is described.

In Case of Continuous Feed

The slide projector as illustrated in the drawings is in the condition when it is not in use, i.e., in the standstill condition. When the slide magazine m is first inserted, prior to slide projecting, into the predetermined position in the slide projector by pushing it in until its front end face contacts one arm end 44a of the stop lever 44 as shown in FIG. 3, the protuberance 39a of the control lever 39 is pushed up in that inserting process by the front end face of the magazine m and said control lever 39 is turned clockwise to the position shown by chain lines in FIG. 3. By this motion of the control lever 39, the intermediate lever 45 is slightly turned counterclockwise because of its counterclockwise bias and another intermediate lever 50 is also turned counterclockwise. By this motion of the intermediate lever 50, the sliding plate 48 is slid downward from the position shown in the figure resisting against the spring 49. At that time, the change-over lever 53 is turned clockwise because its pin 53a is pushed down by the bottom side of the triangular protuberance 51a of the control piece 51 and comes to the position shown in FIG. 7 regardless of the position of the change-over lever 53 before that. As the sliding shaft 62 is slided leftward in FIGS. 7 and 8, because of the above-mentioned motion of the change-over lever 53, through the pin 53b and ring groove 62b, the rotary shafts 60 and 61 also slide leftward together through the flange 62a and come to the position shown by chain lines. Consequently, the gear 60c which is integral with the rotary shaft 60 moves to the position where it meshes only with the skip-tooth gear 59, and the gear 61c which is integral with the rotary shaft 61 moves to the position where it does not mesh with the skip-tooth gear 57.

Figure 12:
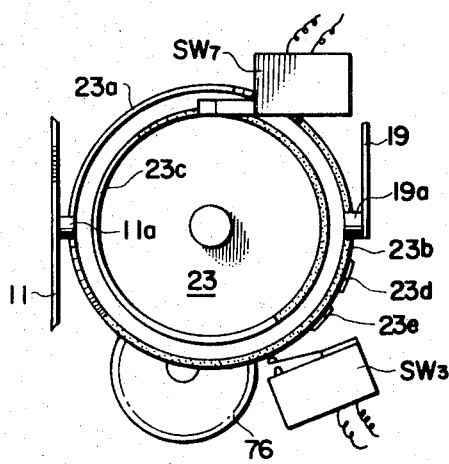
FIG. 12 is a partial view showing the drum cam in the rotating position different from that shown in FIG. 2.
Figure 13:
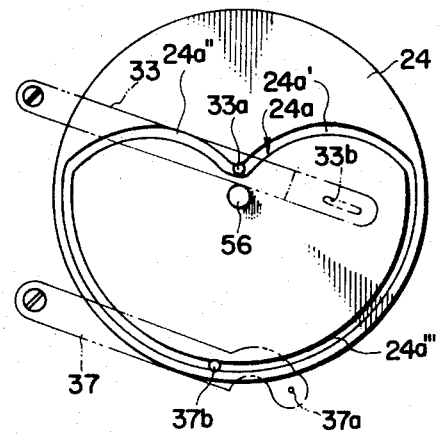
FIGS. 13, 14 and 15 are partial views respectively showing the cam plate in rotating positions respectively different from that shown in FIG. 2.
Figure 14:
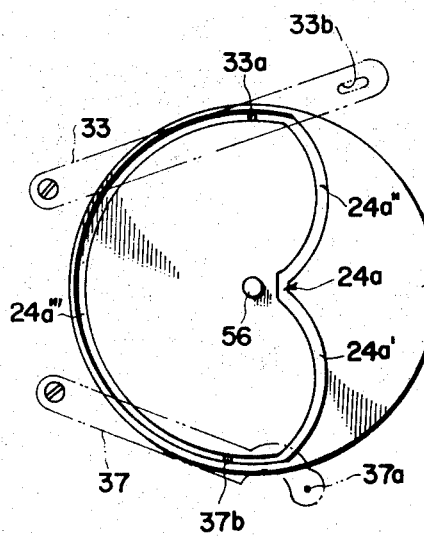
Figure 15:
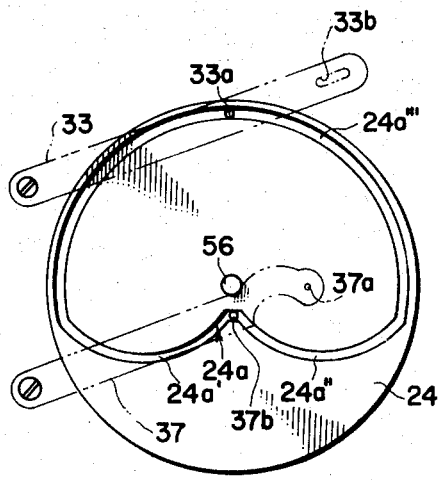

When the starting switch $SW_1$ is pushed under the above condition, the relay $RL_3$ is energized as a voltage is imposed to its terminal (1) and the relay $RL_3$ is held in the energized condition even if the pushed starting switch $SW_1$ is released. Therefore, the relay armatures $RL_{3k1}$ and $RL_{3k2}$ are changed over to positions shown by dotted lines, and the timer $RL_5$ and relay $RL_6$ become ready for operation. As the relay armature $RL_{6k1}$ is in the position shown by full lines in this case, the motor M starts at the same time when the relay armature $RL_{3k2}$ is changed over as described above. When the motor M is thus started, the pulley 73 is rotated by the power transmission means not illustrated here, and consequently, the gear 71 is rotated through the worm 73a and worm wheel 72. This rotating motion of the gear 71 is transmitted to the skip-tooth gears 74 and 69 through the gear 70. As the rotating direction of the motor M is determined beforehand so that these skip-tooth gears 74 and 69 turn clockwise at the position shown in FIG. 10, the skip-tooth gear 74 meshes with the gear 75 and meshing of the skip-tooth gear 69 and gear 68 is released. Therefore, the drum cam 23 is turned counterclockwise at the position shown in FIG. 2 through the gears 75, 76 and 23f. As the pin 11a of the rocking lever 11 is pushed up, by this rotation of the drum cam 23, from the lower cam surface 23b to the upper cam surface 23a, said rocking lever 11 is turned clockwise around its pivot from the position shown in FIG. 4, and at the same time, makes the arm 10 turn counterclockwise. Consequently, the slide carrier 8 is turned counterclockwise through the rotary shaft 9 to the position shown by chain lines in FIGS. 1 and 4. This position is just above the magazine m which was already set. During the above movement, the pin 19a of the rocking lever 19 slides only on the lower cam surface 23b. So, the other slide carrier 13 remains at the position shown by full lines. When the upper cam surface 23a of the drum cam thus comes to the position shown in FIG. 12, the skip-tooth gear 74 and gear 75 are disengaged from each other, and as a result, the drum cam 23 stops at that position. As it is designed beforehand so that the skip-tooth gear 69 and gear 68 are meshed with each other at that time, the cam plate 24 begins to turn clockwise from the position shown in FIG. 2 at the same time when the drum cam 23 stops. Thus, the lever 31 turns clockwise as its roller 31a comes out of the concave 24b of the cam plate 24, and changes over the switch $SW_6$ to the position shown by dotted lines in FIG. 11. Therefore, the motor M keeps on running even if the relay armature $RL_{6k1}$ is changed over to the position shown by the dotted line. As already described, the relay $RL_6$ contains a delay circuit and works in the manner to change over its armature $RL_{6k1}$ from the position shown by the full line (ON) to the position shown by the dotted line (OFF) at a certain time after said relay is energized. Said relay $RL_6$ also works to change over the armature $RL_{6k1}$ to the position shown by the dotted line (OFF) after holding it at the position shown by the full line (ON) for a certain time after the input from the timer $RL_5$ is applied. The circuit constant of said delay circuit is selected so that the above-mentioned "certain time" becomes same as the time from starting of the motor M until starting of the cam plate 24, i.e., the time required to ensure smooth movement of the slide carrier 8 from the position shown by full lines to that shown by chain lines. By the aforementioned clockwise rotation of the cam plate 24, the pin 33a of the rocking lever 33 goes into the portion 24a' of the cam groove 24a. So, the said rocking lever 33 turns clockwise around its pivot from the position shown in FIG. 2 and moves the sliding piece 34 downward along the guide rod 26. By this downward movement of the sliding piece 34, the slide returning plate 35 also moves downward being regulated by the fixed pin 36 and cam groove 35c. That is, the slide returning plate 35 is first turned clockwise from the position shown in FIG. 2 until it becomes vertical, then, it moves downward by keeping that posture. During that downward movement, the protuberance 35b contacts the bent piece 41b of the sliding plate 41, which is clearly shown in FIG. 5, and moves said sliding plate 41 downward. After that, the bent portion 35a passes through the inside of the slide carrier 8 and reaches the position shown by chain lines in FIG. 1. Thus, the said bent portion 35a serves, when a slide is inserted in the slide carrier 8, to return that slide to the proper position in the magazine m. On the other hand, when the sliding plate 41 is moved downward as described in the above, the sliding plate 43 also moves downward because the bent piece 41a of said sliding plate 41 is engaged with the pin 43a. As the pin 44b is pushed by the bottom end of said sliding plate 43, the stop lever 44 is turned counterclockwise around its pivot as seen in FIG. 3, its one arm end 44a retracts out of the path of the magazine m, the other arm end 44c engages with the hook 45a of the intermediate lever 45, thus said lever 44 is held in the above-mentioned counterclockwise-rotated position. When the slide returning plate 35 reaches the lowest position shown by chain lines in FIG. 1, the cam plate 24 rotates about one-fourth turn and the relative position of the pin 33a of the rocking lever 33 and cam groove 24a becomes as shown in FIG. 13. During a slight rotation of the cam plate 24 after the above, the skip-tooth gear 59 fixed to the rotary shaft 56 of the said cam plate 24 turns the gear 60c counterclockwise from the position shown in FIG. 9 and turns the feed pinion 65 clockwise by one pitch at the position shown in FIG. 3 by transmitting the driving power through the gears 63 and 64 which mesh with the gear 60c in turn. As the roller 66a of the regulating lever 66 fits into the space between teeth of the feed pinion 65 at that time, the feed pinion 65 is turned clockwise by one pitch accurately, thus advancing the magazine m also by one pitch by means of the rack, though it is not shown, which is formed on the said magazine m and meshes with the feed pinion 65. At that time, the pin 33a of the rocking lever 33 goes into the cam groove portion 24a''. Therefore, by the succeeding rotation of the cam plate 24, the rocking lever 33 begins to turn counterclockwise around its pivot on the contrary to the aforementioned case. Consequently, the slide returning plate 35 also begins to move upward on the contrary to the aforementioned case, and returns to the position shown by full lines when the cam plate 24 rotates further one-fourth turn (see FIG. 14). At that time, the sliding plate 41 also returns to the position of full lines by means of the spring 42. But, the stop lever 44 is kept locked by the intermediate lever 45 at the counterclockwise-rotated position and, therefore, it does not return to the original position. In the above-mentioned process of movement, the pin 37b of the rocking lever 37 was kept standstill in the illustrated position because it was in the groove portion 24a''' formed by concentric circular arcs. However, after one-half turn of the cam plate 24 as shown in FIG. 14, the said pin 37b is going to enter the cam groove portion 24a' and, on the other hand, said pin 33a already entered the groove portion 24a''' formed by concentric circular arcs. Therefore, during the latter one-half turn of the cam plate 24, the rocking lever 33 is kept standstill at the illustrated position and the rocking lever 37 is rocked. That is, when the cam plate 24 passes the position shown in FIG. 14, the rocking lever 37 is turned counterclockwise around its pivot from the position shown in FIG. 2. So, the interlocking piece 28 begins to move upward along the guide rods 25 and 26 because the pin 37a is engaged in the slot 28b. As the hook 29a of the connecting lever 29, which is pivotably mounted to the sliding frame 27, is engaged with the pin 28a of the interlocking piece 28 at that time, the sliding frame 27 also moves upward being integral with the interlocking piece 28. Consequently, the pushing plate 27a goes into the first slide holding space from below the magazine m and inserts the slide in said space into the slide carrier 8 which is already brought to the position shown by chain lines. When the cam plate 24 further rotates about one-fourth turn (see FIG. 15), the pushing plate 27a reaches the highest position shown by chain lines in FIG. 1. When the cam plate 24 rotates further one-fourth turn and returns to the position shown in FIG. 2, the pushing plate 27a is also returned to the lowest position shown by full lines. As it is evident from the above explanation, if the rotary solenoid 38 is actuated and the driving piece 38a is turned clockwise from the shown position at the time when the rocking lever 37 is in the shown position, the connecting lever 29 is disengaged from the interlocking piece 28 and, therefore, the sliding frame 27 stays at the shown position even if the cam plate 24 rotates. Besides, as the slide inserted into the slide carrier 8 is held securely by the pressing member of the known art which is provided in said slide carrier 8, said slide does not slip off from said carrier 8 even when the pushing plate 27a begins to go down. When the cam plate 24 passes the position shown in FIG. 15 and the pushing plate 27a begins to go down, the skip-tooth gear 74 begins to mesh with the gear 75 again, thus the drum cam 23 begins to turn counterclockwise again from the position shown in FIG. 12. Therefore, the pin 11a of the rocking lever 11 then begins its sliding contact with the lower cam surface 23 of the drum cam 23 again. Consequently, the rocking lever 11, arm 10 and rotary shaft 9 are returned to their original positions by means of the spring 12, and the slide carrier 8 also returns to the position shown by full lines thus bringing the first slide into the projecting light path. At that time, the light source ON-OFF switch $SW_7$ is changed over by the cam surface 23c of the drum cam 23 and the movable contact piece $SW_{7a}$ is connected to the terminal (2) and the movable contact piece $SW_{7b}$ is connected to the terminal (2) respectively as shown by full lines. So, a voltage is imposed to the integrating circuit $I_a$, its output voltage rises gradually to increase the brightness of the light-source lamp $L_a$ gradually through the light adjusting circuit $R_a$, thus the slide is projected onto the screen which is not illustrated here. In this case, the cam plate 24 returns to the original position (as shown in FIG. 1) slightly before the slide carrier 8 returns into the projecting light path and stops at that position as meshing of the skip-tooth gear 69 and gear 68 is disengaged. At the same time, the roller 31a of the lever 31 fits into the concave 24b of the cam plate 24 and the switch $SW_6$ is changed over to the terminal (2) because of counterclockwise turn of said lever 31, thus the power-supply circuit to the motor M is opened. At the same time when the switch $SW_6$ is changed over as above, the time delay relay $RL_7$ is energized and its relay armature $RL_{7k1}$ is connected as shown by the full line, thus a direct current flows to the motor M and it stops quickly without rotating by inertia. Thus, the drum cam 23 stops accurately at the position where the slide carrier 8 is brought into the projecting light path, i.e., at the position where said drum cam 23 is rotated one-half turn. The time delay relay $RL_7$ is then de-energized to return the relay armature $RL_{7k1}$ to the position shown by the dotted line and opens the quick-stop circuit for the motor. When the time preset by the variable resistor $R_v$ passes, a signal is transmitted from the timer $RL_5$ to the relay $RL_6$. So, the relay $RL_6$ is energized again and changes over the relay armature $RL_{6k1}$ again from the position of the dotted line to the position of the full line. As a result, the motor M is started again and the latter half turn of the drum cam 23 begins. As the pin 19a of the rocking lever 19 is pushed up in this case from the lower cam surface 23b to the upper cam surface 23a, the said rocking lever 19 is turned counterclockwise around the rotary shaft 9 from the position shown in FIG. 4. Consequently, the connecting link 16 is also turned counterclockwise through the sleeve 17 from the position shown in FIG. 4 and the arm 15 is also turned counterclockwise from the position shown in FIG. 4. As a result, the slide carrier 13 is turned through the rotary shaft 14 to the position just above the magazine m shown by chain lines in FIGS. 1 and 4. At that time, the slide carrier 8 stays in the projecting light path (position shown by full lines). When the pin 19a of the rocking lever 19 is thus put onto the upper cam surface 23a, i.e., when the slide carrier 13 reaches the position just above the magazine m, the skip-tooth gear 74 is disengaged again from the gear 75 and the skip-tooth gear 69 begins to mesh with the gear 68. So, the drum cam 23 stops and the cam plate 24 begins to turn clockwise again from the position shown in FIG. 2. During one rotation of the cam plate 24, the slide returning plate 35 moves up and down, the magazine m is advanced by one pitch and the second slide is inserted into the slide carrier 13 by vertical motion of the pushing plate 27a according to the sequence as already described, and the cam plate 24 is again returned to the original position (FIG. 2). As already described, the skip-tooth gear 74 meshes with the gear 75 again at the time when three-fourths turn of the cam plate 24 is almost finished (FIG. 13), and therefore, the drum cam 23 begins to rotate again. In the initial stage of the said drum cam rotation, the protuberance 23d formed on the drum cam 23 engages with the pin 46a and pushes it up. Consequently, the sliding plate 46 is slided to the position shown by chain lines in FIG. 3 from the position shown by full lines. By this motion of the sliding plate 46, the rocking lever 47 is also turned counterclockwise through the pin 46b from the position shown by chain lines in FIG. 3 to the position shown by full lines. So, the connecting link 55 is also pulled rightward. Consequently, the change-over lever 54 turns clockwise in FIG. 8 and comes to the shown position. The switch $SW_4$ is changed over to the position shown by the full line in FIG. 11, i.e., to the terminal (1). By the said clockwise rotation of the change-over lever 54, the sliding shaft 62 and rotary shafts 60 and 61 are all slid rightward from their positions shown by chain lines in FIGS. 7 and 8 to positions shown by full lines. Accordingly, the gears 60c and 61c also move from the position shown by chain lines to the full-line position so that the gear 60c can mesh with the skip-tooth gear 58 and the gear 61c can mesh with the skip-tooth gear 57 respectively. After the above-mentioned change-over operation is finished, the drum cam 23 further rotates and the pin 19a of the rocking lever 19 is put into sliding contact with the lower cam surface 23b. Therefore, the slide carrier 13 is brought from the position shown by chain lines to the position shown by full lines and the second slide is brought into the projecting light path other than that to which the first slide was brought in. As the motor M stops then, the drum cam 23 stops at the position where its one rotation is completed. At that time, the light source ON-OFF switch $SW_7$ is changed over by the cam surface 23c of the drum cam 23, the movable contact piece $SW_{7a}$ is connected to the terminal (2) and the movable contact $SW_{7b}$ is connected to the terminal (1) as shown by dotted lines. Consequently, a voltage is imposed to the integrating circuit $I_b$, its output voltage rises gradually to increase the brightness of the light-source lamp $L_b$ through the light adjusting circuit $R_b$, thus the second slide is projected onto the screen which is not shown here. On the other hand, voltage supply to the integrating circuit $I_a$ is shut off at that time and the output voltage of the said integrating circuit decreases gradually. So, the brightness of the light-source lamp $L_a$ is gradually decreased through the light adjusting circuit $R_a$ until the lamp $L_a$ is put out. As it may be evident from the above explanation, the light-source lamps $L_a$ and $L_b$ are turned ON and OFF alternately and repeatedly. Moreover, when one of them is turned ON and its brightness is being increased to the maximum brightness, the brightness of the other lamp gradually decreases from the maximum brightness until said lamp is put out. Therefore, the illumination on the screen is always kept almost constant during the operation of the slide projector, thus fatigue of eyes of those who are looking at the screen can be reduced remarkably.

Figure 9:
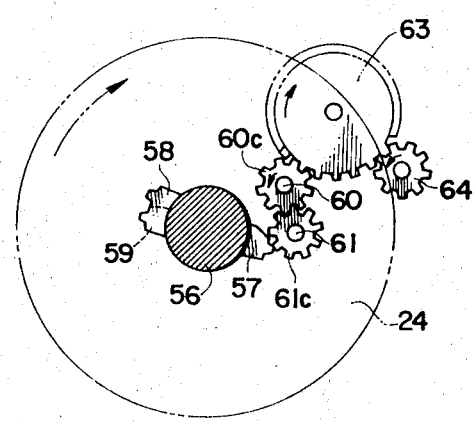
FIG. 9 shows a partial sectional view along the line IX—IX in FIG. 1.
Figure 10:
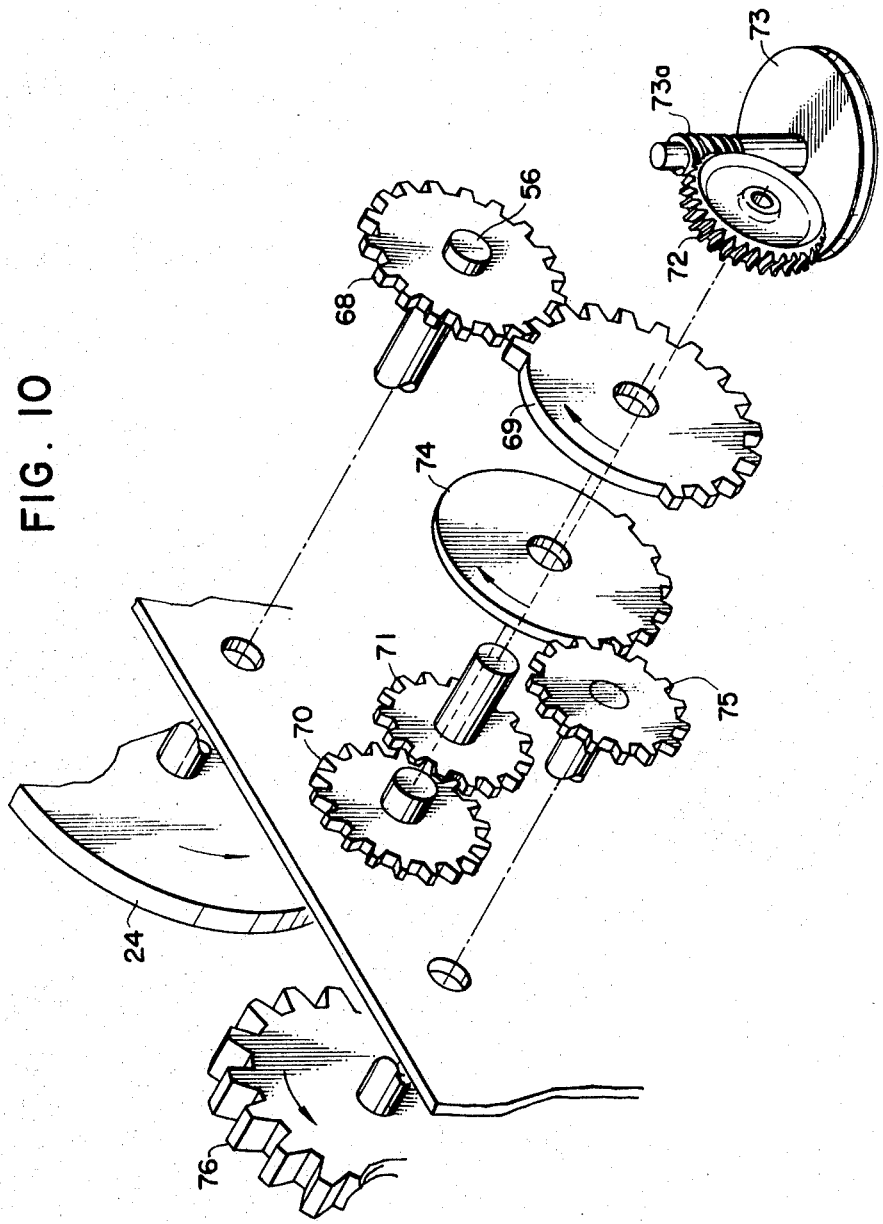
FIG. 10 shows a perspective view of the gear system shown by chain lines in FIG. 3 which are exploded in axial direction.

As it may be clear from the above explanation, one operation cycle of one slide carrier is performed by a half turn of the drum cam 23 and one rotation of thE cam plate 24, while one operation cycle of the other slide carrier is performed by the latter half turn of the drum cam 23 and one rotation of the cam plate 24. After the above, these operation cycles are repeated except for the following point. That is, after the returning stroke to return the already projected first slide to the magazine $m$, i.e., after the stroke to move the slide carrier 8 to the position just above the magazine $m$, the operation sequence becomes different from that described in the above in the following point. Namely, as already described, the sliding plate 46 is pushed by the protuberance 23d of the drum cam 23, and as a result, the gears 60c and 61c are moved to the position shown by full lines in FIGS. 7 and 8. At about that time, the cam plate 24 reaches the position just before the end of its one rotation. As the skip-tooth gear 57 comes at that time to the position where it meshes with the gear 61c, the skip-tooth gear 57 turns the gear 61c clockwise by one tooth at the position shown in FIG. 9 because of the last slight rotating motion of the cam plate 24 when it finished its one rotation. Therefore, this rotation of the gear 61c is transmitted to the gear 60c through gears 61a and 60a and gears 61b and 60b, thus causing the said gear 60c to turn clockwise as seen in FIG. 9, i.e., in the direction opposite to the arrowhead. So, the gears 63 and 64 also turn in the direction opposite to the arrowhead in FIG. 9, and consequently, the feed pinion 65 is turned counterclockwise as seen in FIG. 3 (opposite to the arrowhead) by one pitch. Therefore, the magazine $m$ is moved backward by one pitch and comes to the position where the first slide can be returned to the original slide holding space. Consequently, when the slide carrier 8 is moved again to the position just above the magazine $m$ and the slide returning plate 35 comes down, the first slide which is already projected can be returned to the original position in the magazine $m$. When the slide returning plate 35 thus reaches the lowermost position and its movement is changed to upward movement, the skip-tooth gear 58 meshes with the gear 60, so that, the feed pinion 65 is turned clockwise as seen in FIG. 3 by two pitches and the magazine $m$ is advanced by two pitches. As a result, the third slide holding space of the magazine $m$ comes into the path of the pushing plate 27a, and therefore, the third slide is inserted into the slide carrier 8 by the upward motion of the pushing plate 27a. After that, the magazine $m$ repeats to return by one pitch and advance by two pitches. Therefore, slides are inserted into the slide carriers 13 and 8 one after another in proper order and are returned to the magazine $m$ from the slide carriers 8 and 13 also in proper order.

When all the slides charged in the magazine $m$ are thus projected, the slide carrier 8 which returns into the projecting light path from the position just above the magazine $m$ is empty. Therefore, the light from the auxiliary light source 6, which goes to the photo-transistor 21 through the mirror 8a, directly reaches the photo-transistor 21 though it was shut off before that by the slide when the slide carrier matched in the projecting light path. Therefore, the said photo-transistor 21 is then activated and the relay $RL_1$ is energized. Consequently, the relay armatures $RL_{1k1}$ and $RL_{1k2}$ are both changed over to the position shown by dotted lines in FIG. 11, i.e., to the terminals (2), no voltage is imposed to the integrating circuit $I_a$, and the light-source lamp $L_a$ does not light though the light source ON-OFF switch $SW_7$ is changed over. On the other hand, as an input is applied to the terminal (2) of the timer $RL_5$, the armature $RL_{5k1}$ is changed over to the position shown by the dotted line in FIG. 11. When the time required for one stroke of the mechanism passes, a signal is transmitted from the timer $RL_5$ to the relay $RL_6$ to start the motor M as described before. Therefore, the slide carrier 13 returns into the projecting light path in empty condition when the one operation cycle is finished. But, at the moment when said slide carrier 13 matches in the projecting light path, the light from the auxiliary light source 7 reaches the photo-transistor 22 being reflected by the mirror 13a. Therefore, said photo-transistor 22 is activated, the relay $RL_2$ is energized and the relay armatures $RL_{2k1}$, $RL_{2k2}$ and $RL_{2k3}$ are all changed over to the position shown by dotted lines in FIG. 11, i.e., to the terminals (2). So, the light-source lamp $L_b$ does not light. Besides, at the moment when the switch $SW_3$ is changed over by the protuberance 23e to the position shown by the dotted line in FIG. 11 after one rotation of the drum cam 23, a signal is applied to the terminal (2) of the relay $RL_3$ and the relay $RL_3$ is reset. Therefore, the relay armatures $RL_{3k1}$ and $RL_{3k2}$ are returned to the position shown by full lines in FIG. 11, the driving control circuit is returned to the original condition, i.e., the condition which is ready for operation, thus projecting operation for one magazine is finished. Besides, as a signal is applied also to the terminal (1) of the relay $RL_4$ at the same time when a signal is applied to the terminal (2) of the timer $RL_5$, the relay $RL_4$ is held in the energized condition, and the relay armature $RL_{4k1}$ is changed over to the position shown by the dotted line in FIG. 11. Therefore, the rotary solenoid 38 works, the driving piece 38a turns clockwise as seen in FIG. 2 and releases the engagement of the connecting lever 29 and interlocking piece 28. Besides, at the same time when a signal is applied to the terminal (2) of the relay $RL_3$, signal is applied also to the terminal (2) of the relay $RL_4$. So, the relay $RL_4$ is reset to the original condition, the relay armatures $RL_{4k1}$ and $RL_{4k2}$ are returned to the position shown by full lines in FIG. 11, thus the driving piece 38a of the rotary solenoid 38 is released from pushing the connecting lever 29. Consequently, the sliding frame 27 and interlocking piece 28 can be moved again together with each other.

As it is evident from the above explanation, the corresponding light-source lamp does not light if a slide to be newly brought into the projecting light path is missing during the projecting operation, the rotary solenoid 38 then works and the motion of the mechanism is stopped. Besides, if two slides to be newly brought into the projecting light path are missing successively, neither light-source lamp lights, and moreover, the continuous operation of the slide projector is then suspended in that condition. However, in the stage of operation where the first and second slides are brought into each projecting light path, the switch $SW_4$ is changed over to the terminal (2), and therefore, the operation does not stop. Besides, when it is desired to stop the projecting operation halfway, the push-button switch $SW_5$ may be pressed. That is, when the push-button switch $SW_5$ is pressed, the relay $RL_4$ works, and therefore, the sliding frame 27 is disengaged from the interlocking piece 28 as already described, and operation of the slide projector is stopped as a result. Provided, in this case, that the rocking lever 47 is turned counterclockwise (to the position shown by chain lines) as seen in FIG. 3 by manual operation or automatically by actuation of the rotary solenoid 38, the switch $SW_4$ is changed over from the terminal (1) to (2), and at the same time, the gears 60c and 61c are moved to positions shown by chain lines in FIGS. 7 and 8 by means of the connecting link 55, change-over lever 54, sliding shaft 62 and rotary shafts 60 and 61. Consequently, the feed pinion 65 becomes free and it becomes possible to pull out the magazine m from the slide projector. When the magazine m is thus pulled out, the control lever 39 is turned counterclockwise by the spring 40 to the position shown by full lines in FIG. 3, and therefore, locking of the stop lever 44 by the intermediate lever 45 is released, the sliding plate 48 is released from being pushed by the intermediate lever 50, the stop lever 44 and sliding plate 48 are respectively returned to positions shown by full lines, thus all machine elements are returned to the original condition.

In Case of Individual Feed

When the switch $SW_2$ is changed over at first to the position shown by the dotted line and the starting switch $SW_1$ is then pushed, the relay $RL_3$ is held in the energized condition. So, the motor M starts as already described and the slide carrier 8 or 13, slide returning plate 35 and pushing plate 27a are operated as described before. In this case, however, an input is applied to the terminal (3) of the timer $RL_5$. Therefore, when one operation cycle is finished and the operated slide carrier returns into the projecting light path, the armature $RL_{5k1}$ is changed over by the timer $RL_5$ to the position shown by the dotted line and a signal is applied to the terminal (2) of the relay $RL_3$. Consequently, the control circuit is returned to the original condition, i.e., ready for operation, thus only one slide is projected.

We claim:

1. A slide projector comprising a pair of lamp housings having projection lamps, a magazine adapted to be slidably inserted below said lamp housings, a pair of slide carriers arranged so as to be respectively moved between first positions matching the light paths from said pair of lamp housings and second positions just above said magazine, a feed pinion meshing with said magazine, a first rotatable cam member engaged with said slide carriers in order to move said pair of slide carriers alternately, a second rotatable cam member connected to said feed pinion for rotating said feed pinion by a pre-determined amount, a pushing plate disengageably connected to said second cam member for moving a slide into one of said slide carriers from said magazine after said slide carrier is moved to its second position, and a returning plate connected to said second cam member for moving the slide from said slide carrier into said magazine when said slide carrier is returned to its second position, said slide projector further comprising a pair of auxiliary light source devices and a corresponding pair of photoelectric elements, each of said photoelectric elements arranged adjacent to one of said lamp housings and mounted off axis with respect to its corresponding auxiliary light source, a pair of reflecting mirrors each of which is respectively mounted on each of said slide carriers to reflect light from each of said auxiliary light source devices on-axis to each of said photoelectric elements when said slide carriers are in said first positions if there are no slides in said slide carriers but said reflecting mirrors being obstructed if there are slides in said slide carriers, and a driving control circuit which is coupled to and controlled by said photoelectric elements to turn off the projection lamps housed in said respective lamp housings when said slide carriers are empty at said first positions, respectively, so that light is reflected from said auxiliary light source devices to said photoelectric elements to thereby stop the operation of said slide projector.

* * * * *